(12) United States Patent
Sheleheda et al.

(10) Patent No.: US 10,516,595 B2
(45) Date of Patent: Dec. 24, 2019

(54) MANAGING LARGE VOLUMES OF EVENT DATA RECORDS

(71) Applicant: AT&T Intellectual Property I, L.P., Atlanta, GA (US)

(72) Inventors: Daniel G. Sheleheda, Florham Park, NJ (US); Samuel Norman Alexander, Springfield, NJ (US); John H. Hardenbergh, Hillsborough, NJ (US); Joseph Harten, Long Valley, NJ (US); James Pace, Morris Plains, NJ (US); Chaim Spielman, Spring Valley, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/127,338

(22) Filed: Sep. 11, 2018

(65) Prior Publication Data
US 2019/0007296 A1    Jan. 3, 2019

Related U.S. Application Data

(63) Continuation of application No. 15/185,152, filed on Jun. 17, 2016, now Pat. No. 10,103,964.

(51) Int. Cl.
*H04L 12/26* (2006.01)
*H04L 12/24* (2006.01)
*H04L 29/06* (2006.01)

(52) U.S. Cl.
CPC ............ *H04L 43/16* (2013.01); *H04L 41/069* (2013.01); *H04L 41/0613* (2013.01); *H04L 41/0622* (2013.01); *H04L 43/02* (2013.01); *H04L 43/024* (2013.01); *H04L 63/1408* (2013.01); *H04L 63/1458* (2013.01); *H04L 43/0876* (2013.01)

(58) Field of Classification Search
None
See application file for complete search history.

(56) References Cited

U.S. PATENT DOCUMENTS

| | | |
|---|---|---|
| 7,424,742 B1 | 9/2008 | Dash et al. |
| 7,499,937 B2 | 3/2009 | Maida-Smith et al. |
| 7,571,474 B2 | 8/2009 | Ross et al. |
| 7,774,361 B1 | 8/2010 | Nachengerg et al. |
| 8,099,782 B1 | 1/2012 | Dash et al. |
| 8,423,894 B2 | 4/2013 | Bhattacharya et al. |

(Continued)

OTHER PUBLICATIONS

Non-Final Office Action received for U.S. Appl. No. 15/185,152 dated Jan. 29, 2018, 31 pages.

*Primary Examiner* — Otis L Thompson, Jr.
(74) *Attorney, Agent, or Firm* — Amin, Turocy & Watson, LLP

(57) ABSTRACT

A network device that operates as an analysis platform for analysis of event data records that can provide a flexible approach to event data record aggregation. For example, aggregation can be flexibly turned on or off and dynamically adjusted based on event record volume and other factors such as network capacity or throughput. Devices that are instructed to aggregate records can also be instructed to archive the raw records, e.g., to maintain a full fidelity log of events. Devices can further be instructed to utilize a mixed queue approach to determine an order to deliver those records that includes both older records and newer records.

20 Claims, 10 Drawing Sheets

(56) References Cited

U.S. PATENT DOCUMENTS

| | | |
|---|---|---|
| 8,601,113 B2 | 12/2013 | Dolisy |
| 8,943,102 B2 | 1/2015 | McEnroe et al. |
| 8,997,223 B2 | 3/2015 | Roberson et al. |
| 9,098,804 B1 | 8/2015 | Blitzer et al. |
| 9,167,001 B1 | 10/2015 | Haugsnes et al. |
| 9,191,296 B2 | 11/2015 | Dinger et al. |
| 2006/0236392 A1 | 10/2006 | Thomas et al. |
| 2008/0222653 A1 | 9/2008 | Aaronson |
| 2008/0243872 A1 | 10/2008 | Maida-Smith et al. |
| 2010/0198830 A1 | 8/2010 | Stewart et al. |
| 2011/0196964 A1* | 8/2011 | Natarajan ........... H04L 41/0604 709/224 |
| 2012/0137308 A1 | 5/2012 | Agarwal et al. |
| 2012/0144133 A1 | 6/2012 | Walter |
| 2013/0019244 A1 | 1/2013 | Collins et al. |
| 2013/0305080 A1* | 11/2013 | Behrendt ............ G06F 11/3006 714/2 |
| 2013/0339356 A1* | 12/2013 | Baumgartner ........ G06F 16/215 707/737 |
| 2015/0032888 A1 | 1/2015 | Dinger et al. |
| 2015/0358292 A1 | 12/2015 | Karale |
| 2016/0142174 A1 | 5/2016 | Fine et al. |
| 2016/0247169 A1 | 8/2016 | Sheppard et al. |
| 2016/0292509 A1 | 10/2016 | Kaps et al. |
| 2016/0301709 A1 | 10/2016 | Hassanzadeh et al. |
| 2016/0323767 A1 | 11/2016 | Abdullah et al. |
| 2017/0099176 A1 | 4/2017 | Jain |
| 2017/0099231 A1 | 4/2017 | Li et al. |
| 2017/0180511 A1 | 6/2017 | Mormile et al. |
| 2017/0286497 A1 | 10/2017 | Crabtree et al. |
| 2017/0323237 A1 | 11/2017 | Dunne et al. |

* cited by examiner

EXAMPLES OF DETERMINING VOLUME EXCEEDS DEFINED THRESHOLD (E.G., 208)
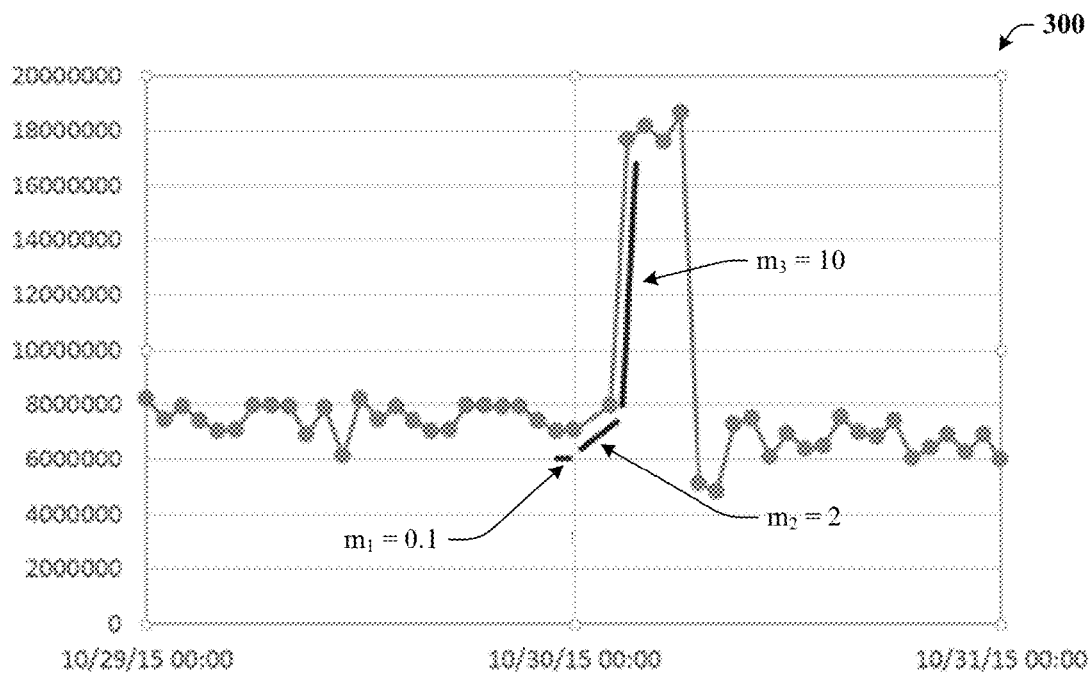
FIG. 3A - RATE OF CHANGE EXAMPLE
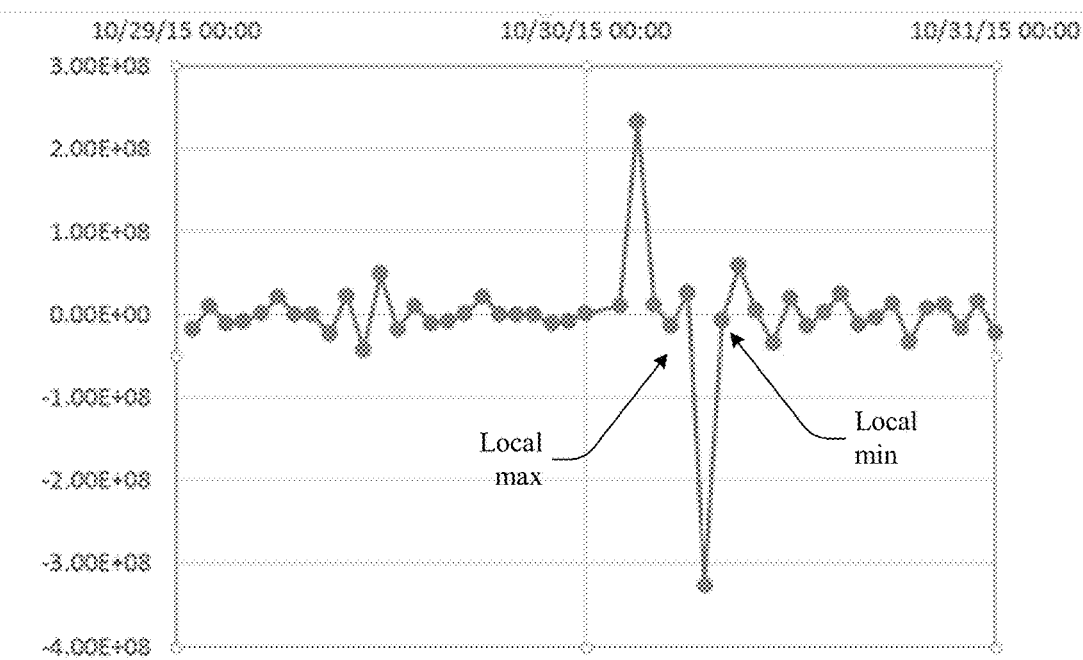
FIG. 3B - VOLUMETRIC EXAMPLE

MANAGING LARGE VOLUMES OF EVENT DATA RECORDS

RELATED APPLICATION

The subject patent application is a continuation of, and claims priority to, U.S. patent application Ser. No. 15/185,152, filed Jun. 17, 2016, and entitled "MANAGING LARGE VOLUMES OF EVENT DATA RECORDS," the entirety of which application is hereby incorporated by reference herein.

TECHNICAL FIELD

The present application relates generally to the field of managing large volumes of event data records such as event data records that are generated in quantities that vary over time and/or cannot be reliably predicted such as records generated as a result of a denial of service attack.

BACKGROUND

In networks today, events occur that can cause issues with the host network or with systems the network serves. In many cases, devices attached to the network can log information about the event in data files, referred to herein as 'event data records' or 'event data logs' or as 'records' or 'logs' for shorthand. These records are typically transmitted to an analysis system to be analyzed, generally in order to determine a remedy to the issue, a cause of the issue, or the like.

In some cases, the quantity/volume of event data records grows so large (e.g., during an 'event storm' or 'event flood') as to outstrip the network's capacity to transmit all the data records to the analysis system. In such situations, a local device that either generates the event data records or collects those event data records for submission to the analysis system conventionally has two options. As one option, excess event data records (e.g., those not able to be transmitted) can be purged, resulting in a loss of data. As another option, the local device can aggregate the event data records according to some aggregation scheme, and the aggregated records can be delivered to the analysis system.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIG. 3A depicts an example graph illustrating a rate of change example that can be used to trigger aggregation in accordance with certain embodiments of this disclosure;

FIG. 3B depicts an example graph illustrating a volumetric example that can be used to trigger aggregation in accordance with certain embodiments of this disclosure;

DETAILED DESCRIPTION

OVERVIEW

Figure 1:
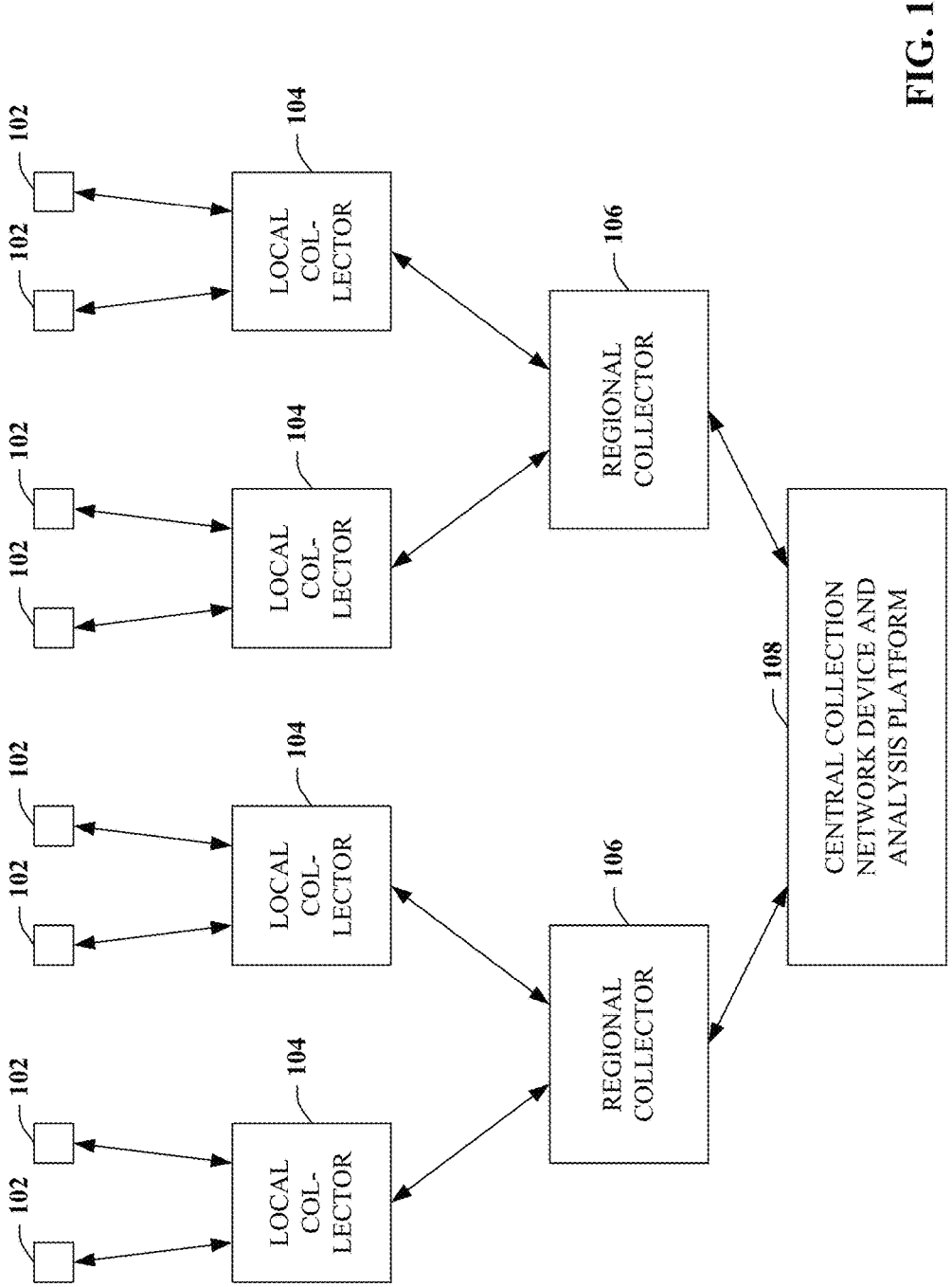
FIG. 1 illustrates a diagram of an example system illustrating an example network topology for event data record collection in accordance with certain embodiments of this disclosure.

The ability to delivery large amounts of data can be difficult, especially when the volume of the data is not predictable. For example, a distributed denial-of-service (DDoS) attack or a flood of event records from an elastic cloud computing implementation can occur with little or no predictability and the volume of event data records can increase by many orders of magnitude relative to an average or normal volume. If too many records are generated, the collection/sending system(s) may not be able to send all of the data over the network to the receiving system(s) and data will begin to back up on the sending system. This can cause eventual loss of data as well as data latency such as not receiving the most important data files first. This disclosure describes a dynamic system that can reduce the amount of data volume and intelligently balance the delivery of the files during periods of event floods.

Some existing techniques to solve the volume of records issue generated by event floods includes predetermined data limits, predetermined or "hard coded" aggregation and data sampling techniques (e.g., only getting some of the records). Additionally, in existing systems the delivery of backed up files on the sending system is also predetermined, which use either a first-in-first-out (FIFO) or last-in-first-out (LIFO) scheme. At some point, the files not able to be sent are deleted from the collection system resulting in total data loss.

This disclosure provides for dynamically and intelligently initiating data aggregation techniques during, e.g., an event flood to scale the data to the highest fidelity possible within the acceptable volume limits, e.g., due to network capacity or the like. Such an approach is different in that such can provide complete data fidelity during normal event loads, and enable intelligent scaling based on dynamic aggregation key sets during higher and higher event loads. Today's systems do not provide such functionality. Additionally, by balancing the delivery of both old and new files, a mixture (e.g., between older records and newer records) of information can he received for analysis purposes. This mixing approach is contrasted with a singleton decision of FIFO or LIFO implemented by other systems. It is understood that, while the disclosed subject matter can substantially improve or optimize data fidelity (by, e.g., aggregating only when needed and only to the level of aggregation needed), most aggregation inherently reduces data fidelity. In more detail, various techniques disclosed herein are logically divided into three parts indicated below.

Dynamic Aggregation

Many analysis platforms (e.g., security) are tasked with ingestion of event data records. These records in their raw form are generated in ordinary volume during normal times, but tend to grow to massive volumes, especially when generated from the network security devices of large enterprises. If the volume of event data records is too large to effectively send as raw data, intelligent data aggregation can be performed. The broad concept of data aggregation is well understood and generally uses a predefined set of keys in the data records to group highly similar records (perhaps completely duplicate) into a summary record form, referred to herein as an aggregated record. Selecting very specific aggregation keys tends to result in a lower level of aggregation of the records, but will tend to have higher fidelity to the original, raw data record. Also, aggregation is often time bounded, so smaller aggregation time windows will tend to result in a larger number of aggregated records (e.g., less aggregation) than larger time windows. The newly aggregated records can include meta data to help describe the aggregated event records by adding items such as an aggregated record count and the first and last record timestamp of the raw records included in this aggregation.

The disclosed subject matter can improve on the classic aggregation approach by dynamically determining an acceptable aggregation level based on the "scale" of the resulting aggregated record count. If the volume of output based on some set of aggregation keys is considered too large, the system can further reduce the aggregated record volume by, e.g., broadening the aggregation keys (e.g., using fewer keys to perform the aggregation matching) or by increasing the aggregation time window. This dynamic aggregation "backoff" can be sampled and the aggregation level dynamically adjusted based on an improved or optimal volume scale. If the volume of raw event data records becomes less, the aggregation will go back "up" to better fidelity (e.g., more aggregation keys or a smaller time window), or completely stop aggregation and return to raw event data record delivery. As noted, adjusting the time bounding for the aggregation is an additional control that can be utilized to help "scale" the events to the desired volume. The original security event files (without any aggregation) can optionally be held aside on the sending system for eventual forwarding to the receiving systems or reacquisition from the source systems. Delivery of the raw files can occur either out of band or once the event volume is low enough to permit sending of the full fidelity version of the event log.

Mixed Queue Approach

When data event records are queuing up on a collection system for delivery to other systems (e.g., an analysis system), conventional systems usually predetermine the order of the records sent to the analysis system. Typically, conventional systems will select in advance to use either a FIFO approach (e.g., delivery of oldest records first) or a LIFO approach (e.g., delivery of newest records first). For cyber security and other domains as well, such selection can be problematic as it can be advantageous to see both the beginning of a security incident as well as the most recent events to determine the current status of the security incident.

This disclosure provides a mixed or combination queue approach that can intelligently control delivery of some of the records from a FIFO-based selection queue as well as some of the records from the LIFO-based selection queue. In essence, the mixed approach can be thought of as an "outside in" approach sending some of the oldest event data records and some of the most recent event data records. Eventually, the files in the middle will become oldest or newest and scheduled for delivery. A policy to control weighting of FIFO and LIFO files can be provided by a weighting factor described herein.

Fidelity Archival

As another advantage provided herein, systems or devices that aggregate event data records can be instructed to retain the raw, un-aggregated (e.g., full fidelity) event data records, which can be retrieved at a later time, such as after the event flood passes.

Raw, un-aggregated event data records are also of interest to collection platforms, even if those platforms previously attained an aggregated event data record representing the raw record. At the intelligent aggregation points, a full raw stream of events can be redirected to an external collection platform to maintain an archive of the raw event data records, thereby maintaining full integrity of the full data set. Such can provide a distributed network of sub-platforms that can be polled for recreation of the entire raw dataset.

EXAMPLE SYSTEMS

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, system 100 is depicted illustrating an example network topology for event data record collection. System 100 can include record generation devices 102, which can be substantially any electronic device capable of connecting to a network. A non-exhaustive list can include, e.g., a mobile device, tablet, laptop, personal computer, or other user equipment (UE), a sensor device, a server device (e.g., cloud computing server, gateway server), or the like. As the name suggests, record generation devices 102 will, in response to defined criteria, generate an event data record representing a log of the event.

These records can be analyzed by interested parties in order to uncover information about the event such as, e.g., a cause of the event, whether the event has ended or is ongoing, a current or future remedy, and so forth. Since most events of interest are not limited to one device 102, but rather affect many devices 102, analysis is generally performed at a centralized site (e.g., analysis platform 108), sometimes referred to as a 'data lake'. The data records of the type (e.g., security, etc.) being analyzed can be brought to this central record collection site for analysis.

System 100 can include local collector devices 104 that can receive event data records from record generation devices 102. Local collectors 104 can be geographically local to the devices 102 served by the respective local collector device 104 and can operate as an intermediate warehouse for event data records prior to forwarding those records to regional collectors 106, which in turn can be forwarded to central collection network device and analysis platform 108 referred to herein as network device 108 or analysis platform 108.

It is understood that additional tiers of collector devices can exist in some embodiments. Additionally or alternatively, not all depicted collectors need exist in all embodiments. For example, devices 102 might report to regional collectors 106 or even analysis platform 108. In some embodiments, local collectors 104 may report to analysis platform 108 or another tier of collectors. In some embodiments, a single device or site may operate as one or more of the illustrated types. For instance, a local collector 104 may also operate as a regional collector 106 for other local collectors 104, may include record generation devices 102 and so forth.

Figure 2:
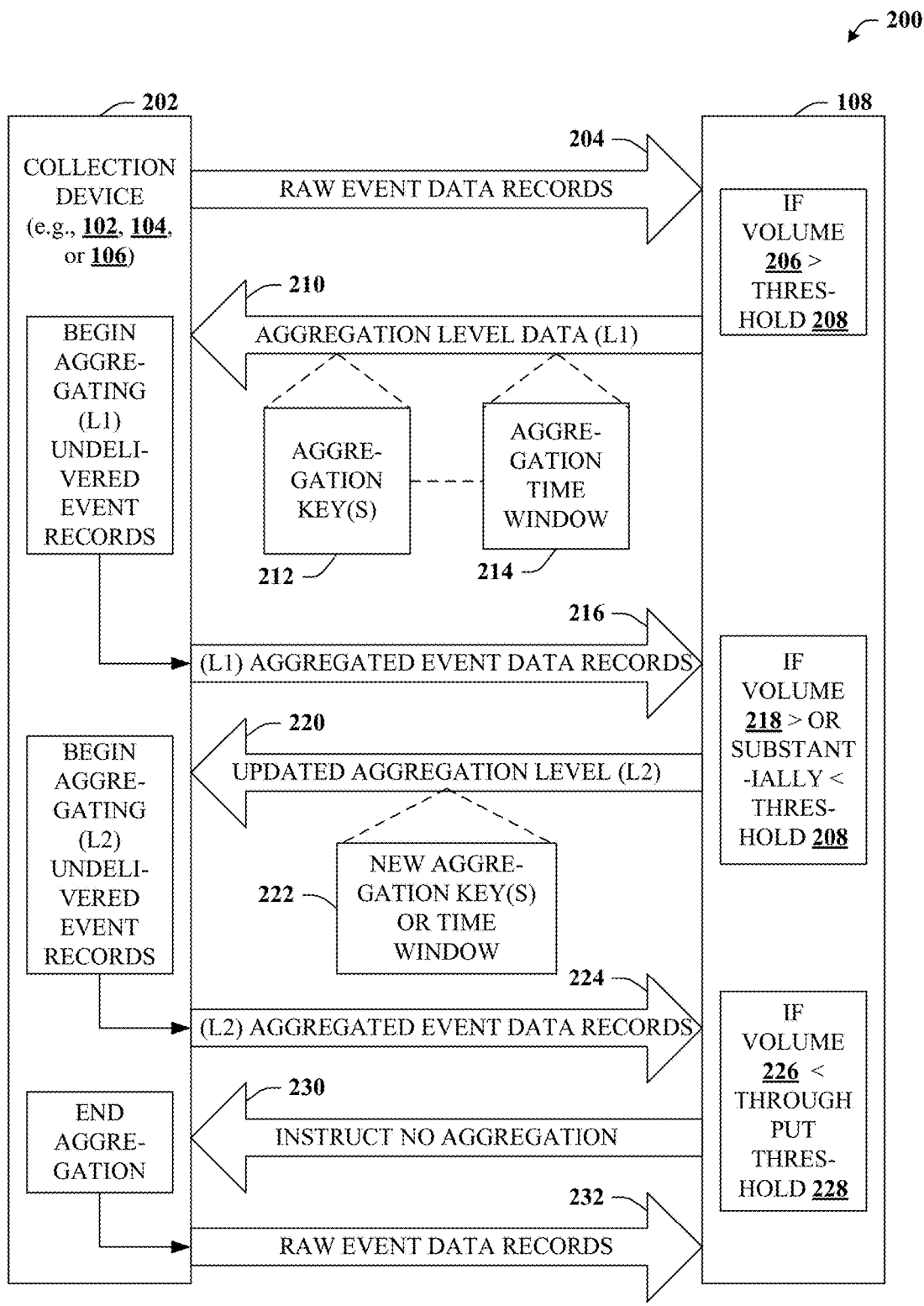
FIG. 2 illustrates an example system that can provide for a flexible approach to event data record aggregation in accordance with certain embodiments of this disclosure.

Turning now to FIG. 2, system 200 is depicted. System 200 can provide for a flexible approach to event data record aggregation. For example, system 200 can be flexible in terms of whether aggregation is used at all in a given situation and, when aggregation is used, can flexibly scale to a level of aggregation that is determined to be sufficient or optimal. Such can be contrasted with other aggregation systems that are in effect "always on" (e.g., aggregation of records even when such is not needed). Additionally, such can be contrasted with other aggregation systems that aggregate according to a predefined scheme and/or do not dynamically scale the level of aggregation.

System 100 can comprise network device (e.g., an analysis platform) 108 that can receive raw event data records 204 from collection device 202. Collection device 202 is intended to represent a source for event data records and can be, e.g., record generation device 102, local collector 104, regional collector 106 or another suitable device. Raw event data records 204 are intended to represent event data records in raw, un-aggregated form, which maintain full data fidelity. Raw records 204 can be delivered during 'normal' operation period, which favors fidelity over aggregation.

As noted, security and other analysis systems sometimes observe an unexpected and dramatic increase in the volume of event data records. Network device 108 can determine that volume 206, representing a volume of raw event data records 204 received by network device 108, equals or exceeds a defined threshold 208. Such a determination can represent an event flood or storm for which the volume of raw event data records 204 cannot be reliably delivered to network device 108. In response, network device 108 can instruct collection device 202 to begin aggregating event data records generated during the 'storm' operation period.

One example of an event storm can be a distributed denial of service (DDoS) attack, which is generally relevant to security systems. Many of the examples provided herein are discussed in terms of security, yet it is understood that the disclosed subject matter can apply to other domains as well. For example, the volume of event data records relating to elastic cloud computing or the like can change significantly and sometimes unpredictably, which can result in an event storm situation. As another example, sensors that monitor weather or environmental metrics or sensors that monitor goods may produce event storms in response to environmental phenomena. The subject matter disclosed herein can benefit any suitable analysis domain, and the cause or causes of the event storm need not be due to malicious behavior typical for security systems.

While still referring to FIG. 2, but turning as well to FIGS. 3A and 3B, two example mechanisms are provided for determining that volume 206 meets or exceeds defined threshold 208 introduced at FIG. 2. Said differently, FIGS. 3A and 3B provide two examples for determining when to trigger aggregation.

Aggregation can operate to reduce hundreds, thousands, or more event data records into a single aggregated record of approximately the same data size as one raw record (e.g., one raw record plus some additional metadata). Aggregation can thus significantly reduce network resources required to deliver records to network device 108, but inherently diminishes the fidelity of the information network device 108 receives for analysis. Thus, the ability to selectively trigger aggregation represents a significant advantage of the disclosed subject matter.

FIG. 3A depicts graph 300 illustrating a rate of change example that can be used to trigger aggregation (e.g., used to determine volume 206>defined threshold 208). In this example, the rate of change threshold 208 is exceed in response to a determination that slopes of a number of records received by network device 108 plotted over time increases for n consecutive time intervals, where n is >1. In this example, n=3 and the slope (e.g., m1) over the first time interval shows a mild increase at "0.1" The slope over the second indicated time interval (e.g., $m_2$) shows another increase at "2" and the slope over the third indicated time interval (e.g., $m_3$) shows a significant increase at "10". Since $m_3>m_2>m_1$, the rate of change trigger is deemed to be met and aggregation can be initiated or increased to a higher level of aggregation. It is understood that this example rate of change detection mechanism is not directly tied to a numeric quantity and can therefore provide scalability advantages.

As another example, FIG. 3B depicts graph 310 illustrating a volumetric example that can be used to trigger aggregation (e.g., used to determine volume 206>defined threshold 208). In this example, the volumetric threshold 208 is met or exceeded in response to a volumetric maximum determined as a first derivative function of volume of the first raw event data records over time. Here the first derivative is taken and the point where the graph of the first derivative values of the event volume as a function of time crosses from positive to negative numbers indicates a volume peak or local maximum. Where the graph crosses from negative to positive values indicates a volume trough or local minimum. Applying a simple smoothing algorithm to the pre-plotted data can reduce noise and lead to better detection.

Continuing the discussion of FIG. 1, once it is determined by the described rate of change detection mechanism, the described volumetric detection mechanism, or another suitable mechanism that volume 206 has met or exceeded defined threshold 208, network device 108 can instruct collection device 202 to perform a first level of aggregation (L1). For example, network device 108 can transmit aggregation level data 210 to collection device 202. In some embodiments, the first aggregation level can be selected to substantially maximize record fidelity (e.g., the least amount of aggregation necessary) based on volume 206 and/or defined threshold 208, which can be a function of available network capacity, throughput, or another suitable metric.

Aggregation level data 210 can include aggregation key data 212 representing one or more keys to be used for aggregation. Example keys can include a source Internet protocol (IP) address, a destination IP address, a port identifier, a protocol identifier, an event identifier, and many others typically selected based on domain and/or the type of analysis to be performed. Selection of keys 212 of fields of an event data record that include data more likely to be the same for many records will result in higher aggregation ratios, but will concomitantly reduce event data record fidelity more. Likewise, selection of fewer keys 212 will result in higher aggregation ratios, but will concomitantly reduce event data record fidelity more. On the other hand, selection of keys 212 of fields of an event data record that include data less likely to be the same for many records will result in lower aggregation ratios, but will reduce event data record fidelity less. Likewise, selection of more keys 212 will result in lower aggregation ratios, but will reduce event data record fidelity less.

Aggregation level data 210 can also include aggregation time window data 214. Aggregation time window data 214 can represent a time period during which aggregation of raw event records with the same sets of keys 212 are aggregated into a single aggregated record. Increasing time window 214 can provide higher aggregation rates, and a greater reduction of data fidelity, whereas decreasing time window 214 can provide lower aggregation rates and a lower reduction of data fidelity. Accordingly, by dynamically selecting one or both keys 212 and time window 214, a suitable aggregation level can be provided based on a function of event data records being received at network device 108.

Collection device 202 can receive aggregation level data 210 and begin aggregating undelivered event records, which can be delivered to network device as aggregated event data records 216 in addition to or instead of raw event data records 204. If a volume 218, representing a volume of aggregated event data records 216 (and raw event data records 204, if any) is greater than defined threshold 208 (or another defined threshold) or volume 218 is substantially less than defined threshold 208 (or another defined threshold), then aggregation level data (L1) 210 can be updated to a different aggregation level (L2) via updated aggregation level data 220.

Updated aggregation level data 220 can include new aggregation keys 212 and/or a new aggregation time window 214, denoted here as new data 222. If volume 218 is greater than the threshold parameter (e.g., defined threshold 208), such can indicate the volume of received records is still too great and updated aggregation level data 220 can represent an increase to the aggregation ratio. If volume 218 is substantially less than the threshold parameter (e.g., defined threshold 208), such can represent available network capacity or throughput, so updated aggregation level data 220 can represent a decrease to the aggregation ratio to enable better data record fidelity. In response, collection device 202 can begin aggregating undelivered event data records according to the updated aggregation level 220, denoted here as aggregated event data records 224.

In some embodiments, selection of aggregation level data 210 and/or updated aggregation level data 220 can be based on machine-learning heuristics in light of volumes 206, 218. The aggregation level indicated by data 210, 220 can be selected based on a goal of maximizing data fidelity associated with the event data records, while ensuring the volume of aggregated event data records can be successfully delivered to network device 108 given available network capacity or throughput.

When the event flood ends, and event data records are generated at a normal or acceptable level without any aggregation, network device 108 can instruct collection device 202 to terminate aggregation via instruction 230, and all undelivered and subsequent event data records can be transmitted in raw, full-fidelity form, denoted as raw event data records 232. In this example, such occurs when a volume 226 of event data records (either raw or aggregated) received is below a network throughput threshold 228. It is understood that determinations to initiate aggregation, increase or decrease aggregation level, and to end aggregation can be a function of numerous factors such as, e.g., a volume of records, either aggregated or raw, received by network device 108 from one or more collection device(s) 202, a pattern of that volume of records (e.g., a rate of change) received by network device 108, as well as various network resources such as capacity, bandwidth, throughput or the like or an availability thereof.

Figure 4:
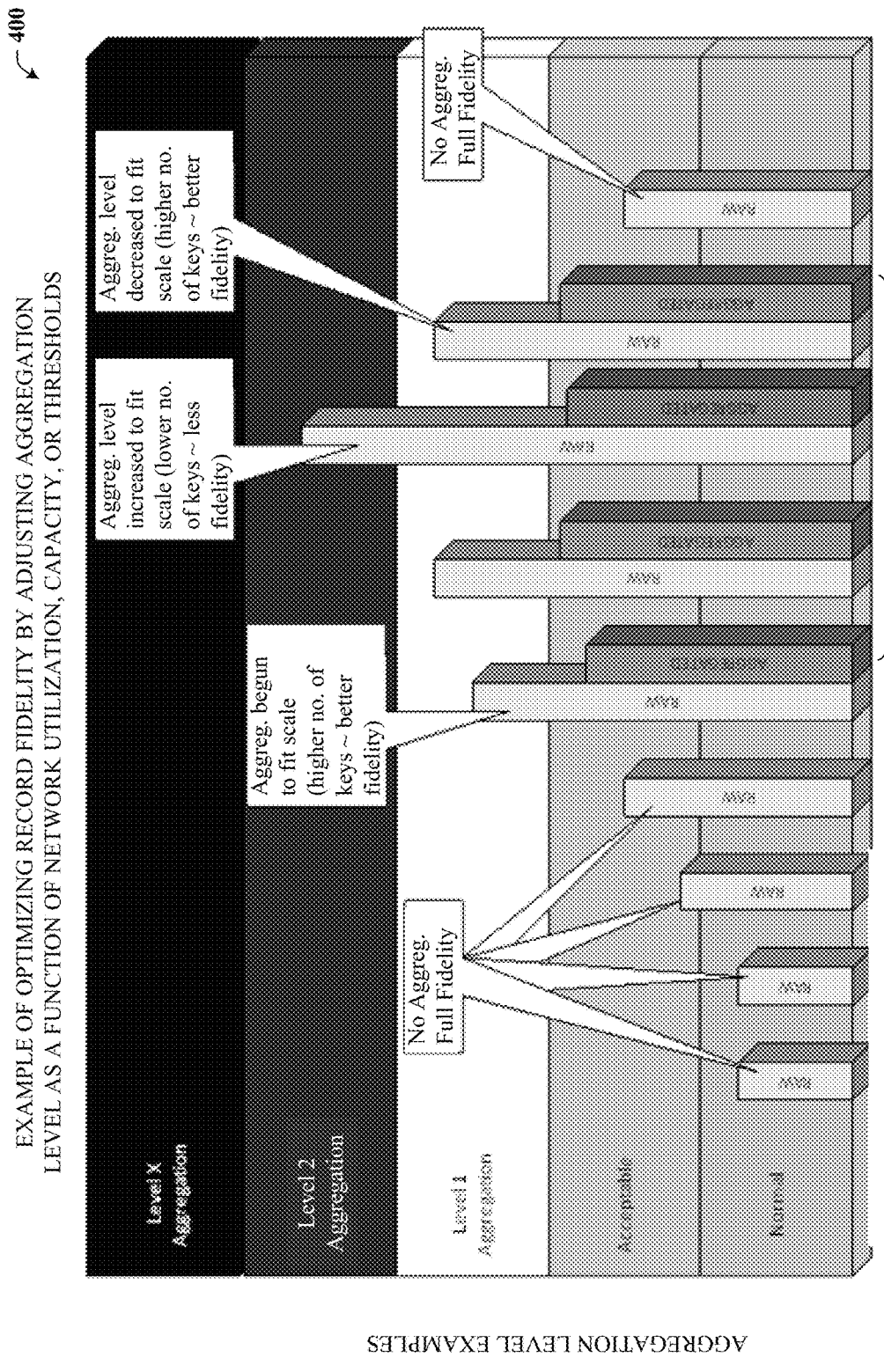
FIG. 4 depicts a block diagram of an example graph that illustrates an example of optimizing record fidelity by adjusting aggregation level as a function of volume or network utilization, capacity, or thresholds in accordance with certain embodiments of this disclosure.

With reference now to FIG. 4, graph 400 is illustrated. Graph 400 illustrates an example of optimizing record fidelity by adjusting aggregation level as a function of volume or network utilization, capacity, or thresholds. Graph 400 shows that when a volume of event records is low (denoted here as 'normal' or 'acceptable'), raw, un-aggregated records are transmitted. When the volume increases beyond acceptable levels, that volume is reduced via aggregation that combines multiple records based on configurable keys (e.g., keys 212) and/or a configurable time window (e.g., time window 214), both of which can be adjusted to change the aggregation level. The aggregation level can be dynamically updated to, e.g., ensure that the volume of delivered records is near to, but does not surpass acceptable levels. Hence, the fidelity of records received can be effectively optimized.

During aggregation, in which aggregated event data records are transmitted instead of the raw event data records, a source of the event data records (e.g., collection device 202) can be instructed to retail the raw event data records that are not delivered to the analysis system (e.g., network device 108). These retained records can be retrieved at a later time (e.g., after the event flood as ended) for a full fidelity record.

Figure 5:
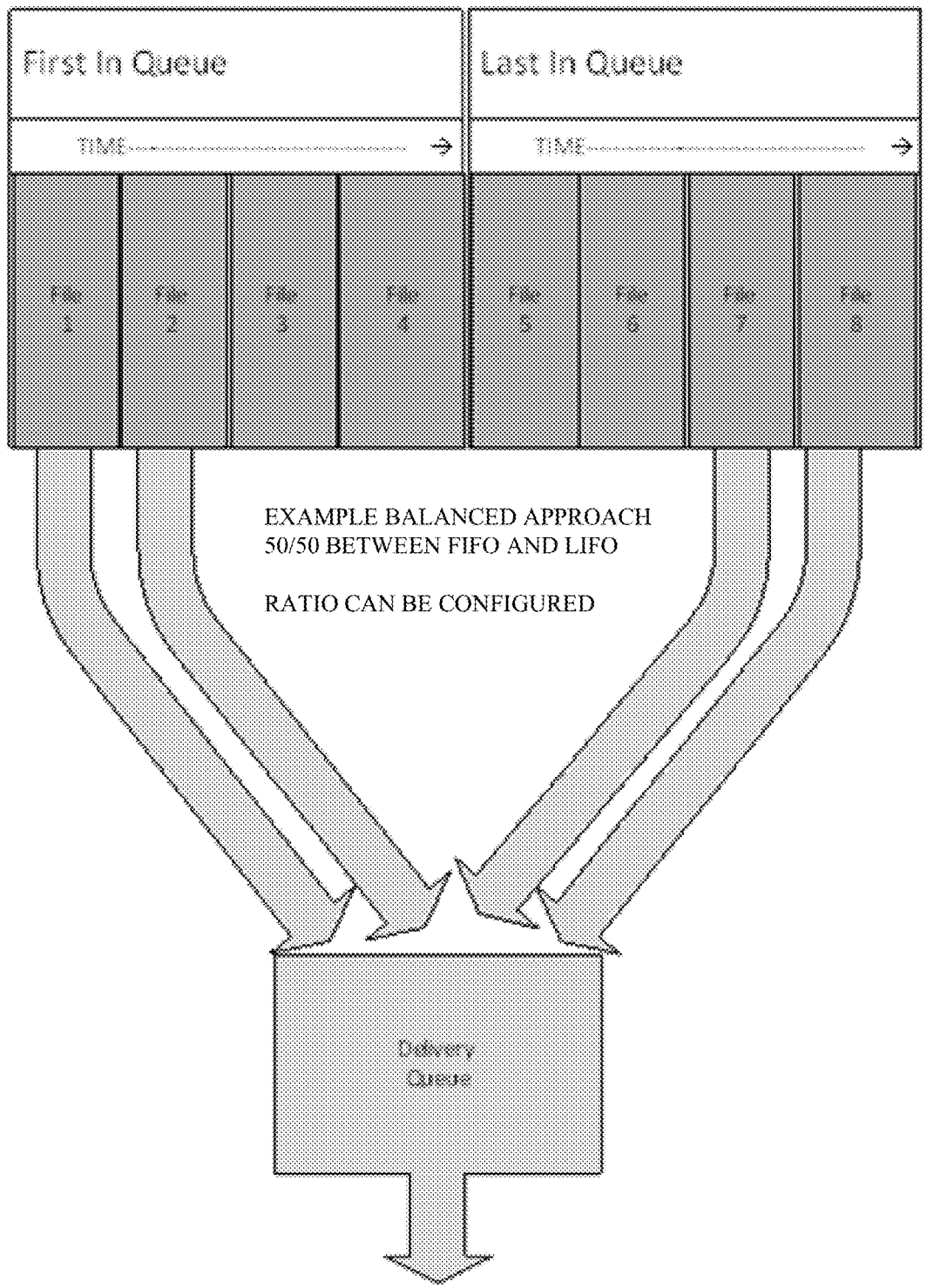
FIG. 5 illustrates a block diagram of an example system that can provide for a mixed ratio record delivery approach that can be configured in accordance with certain embodiments of this disclosure.

Turning now to FIG. 5, illustrates system 500. System 500 can provide for a mixed ratio record delivery approach that can be configured. As noted, the event data records can be analyzed to, e.g., determine information about causes of or solutions to an event storm. Convention analysis systems tend to utilize a fixed approach, usually selecting in advance either a first-in-first-out (FIFO) approach in which the oldest records are transmitted to the analysis system first, or a last-in-first-out (LIFO) approach in which the newest records are transmitted to the analysis system first. The FIFO approach tends to focus on determining a cause of the event storm by first looking at the oldest records, whereas the LIFO approach tends to focus on remedies that should be pursued right now by looking at the newest records.

In some domains, such as security and others, a balanced or mixed approach can be advantageous. For example, a first portion of delivered records can be based on a FIFO approach (e.g., oldest records first) to help better understand a cause of the event storm. A second portion of delivered records can be based on a LIFO approach (e.g., newest records first) which may indicate that the event storm has already passed or is increasing in severity, decreasing in severity, or the like. In this example, the mixed approach is depicted as a 50%/50% split between FIFO and LIFO, but it is understood that the ratio of FIFO to LIFO can be other values and can be configured and updated based on a determined need at the analysis platform/network device 108.

Referring briefly back to FIG. 1, it is understood that multiple tiers (which can be hierarchical) of record collection can exist. In a simple embodiment, network device 108 can instruct regional collectors 106 with regard to initiating, terminating, or dynamically configuring various levels of aggregation as well as other elements detailed herein (e.g., mixed delivery approach, instruction to retain raw records, etc.). However, it should be appreciated that such instruction can exist in a tiered or hierarchical manner as well. For example, network device 108 might instruct regional collectors 106 to aggregate at a first level and local collectors to aggregate at a second level, which can be the same or different from the first level. As another example, network device 108 might instruct a first portion of collectors 106, 104 to aggregate at a first level and another portion of collectors 106, 104 at a second level that can be the same or different from the first level. In some embodiments, determination of a level of aggregation or other elements detailed herein (e.g., mixed delivery approach, instruction to retain raw records, etc.) can be performed in whole or in part by collectors 106, 104.

EXAMPLE METHODS

Figure 6:
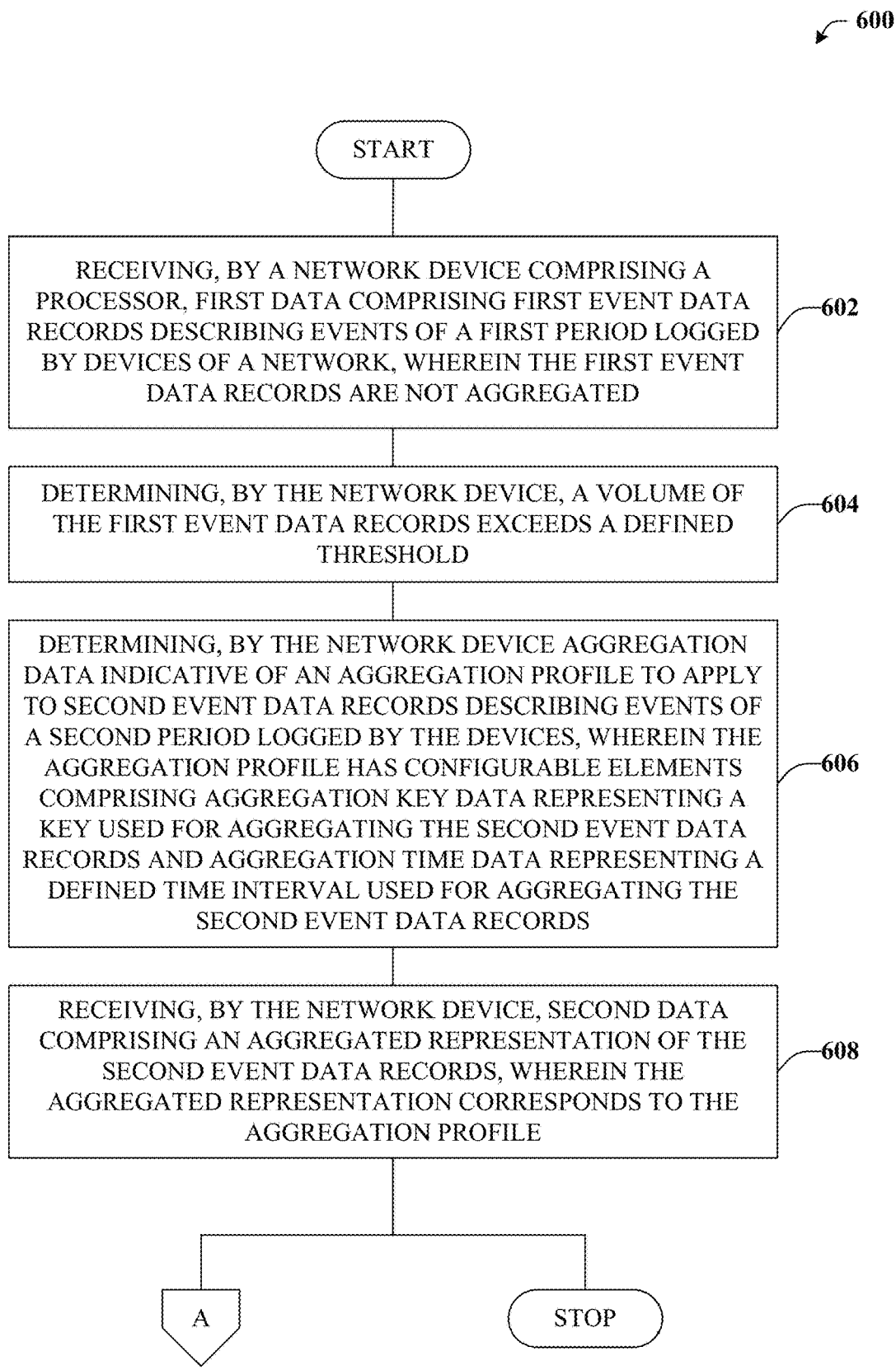
FIG. 6 illustrates an example methodology that can provide for a flexible approach to event data record aggregation in accordance with certain embodiments of this disclosure.
Figure 7:
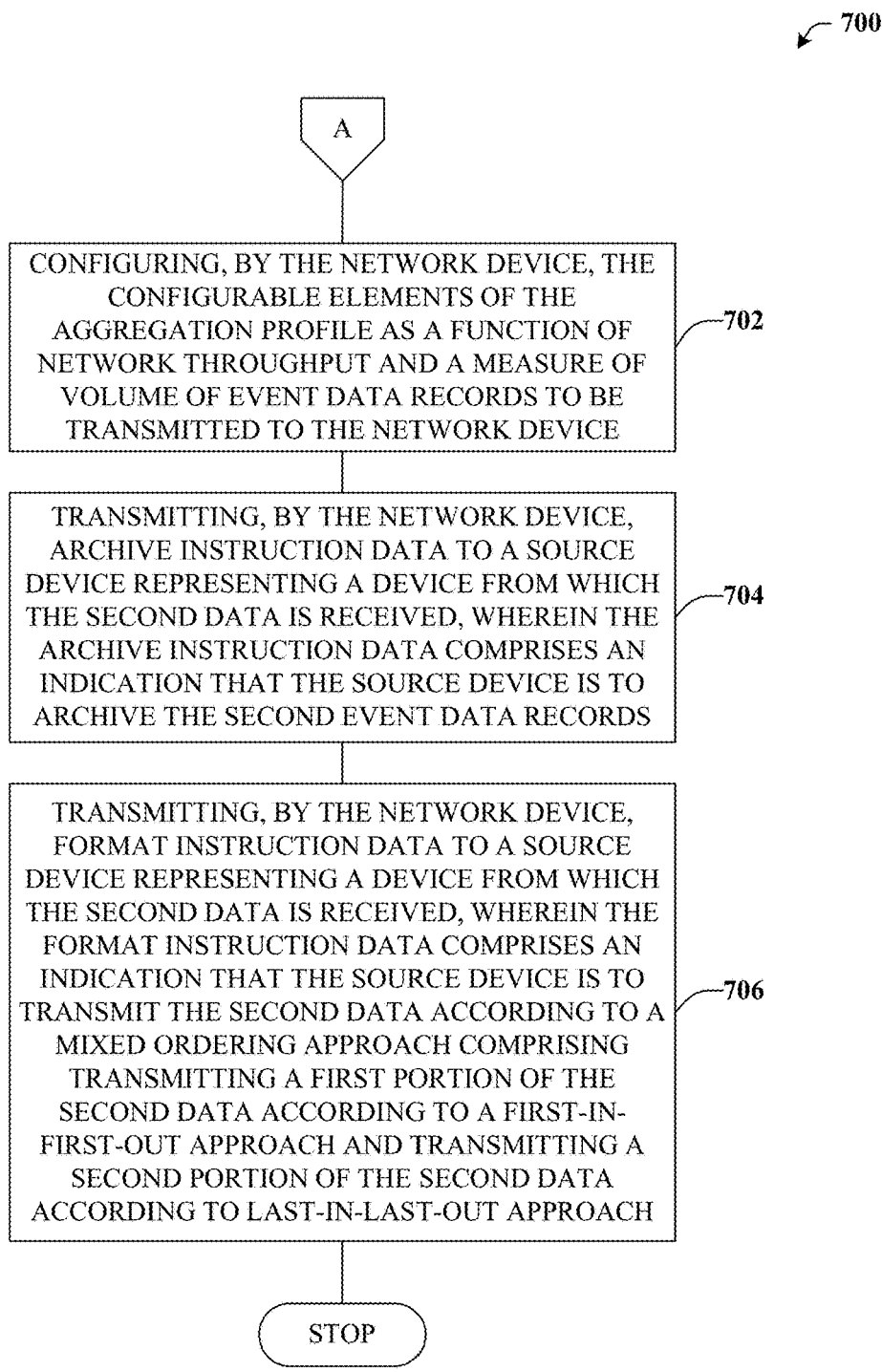
FIG. 7 illustrates an example methodology that can provide for additional elements or aspects in connection with providing a flexible approach to event data record aggregation in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can provide for a flexible approach to event data record aggregation. For example, at reference numeral 602, a network device comprising a processor can receive first data comprising first event data records describing events of a first period (e.g., a period during which aggregation is not requested) logged by devices of a network, wherein the first event data records are not aggregated. For example, first event data records can be in raw, full fidelity form. Conventional systems that use aggregation typically receive only aggregated records, which is distinct from the disclosed subject matter that can receive both raw records and aggregated records should aggregation become necessary or useful.

At reference numeral 604, the network device can determine that a volume of the first event data records exceeds a defined threshold. The defined threshold can be a volumetric threshold, a rate of change threshold, or another suitable threshold.

At reference numeral 606, the network device can determine aggregation data indicative of an aggregation profile to apply to second event data records describing events of a second period (e.g., a period during which aggregation is requested) logged by the devices, wherein the aggregation profile has configurable elements comprising aggregation key data representing a key used for aggregating the second event data records and aggregation time data representing a defined time interval used for aggregating the second event data records.

At reference numeral 608, the network device can receive second data comprising an aggregated representation of the second event data records, wherein the aggregated representation corresponds to the aggregation profile. Method 600 can proceed to insert A, which is further detailed in connection with FIG. 7, or stop.

With reference now to FIG. 7, exemplary method 700 is illustrated. Method 700 can provide for additional elements or aspects in connection with providing a flexible approach to event data record aggregation. For example, at reference numeral 702, the network device can configure the configurable elements of the aggregation profile as a function of network throughput and a measure of volume of event data records to be transmitted to the network device. For example, if a higher volume of records can be supported by the network, then aggregation can be reduced or terminated. If the volume of records is above an acceptable threshold, then aggregation can be increased. The level of aggregation tends to be inversely related to the fidelity of the event data records received.

At reference numeral 704, the network device can transmit archive instruction data to a source device representing a device from which the second data is received, wherein the archive instruction data comprises an indication that the source device is to archive the second event data records. Thus, even though aggregated records are delivered to the network device, the full fidelity raw records can be retained for later access or recall.

At reference numeral 706, the network device can transmit format instruction data to a source device representing a device from which the second data is received, wherein the format instruction data comprises an indication that the source device is to transmit the second data according to a mixed ordering approach comprising transmitting a first portion of the second data according to a first-in-first-out approach and transmitting a second portion of the second data according to last-in-last-out approach.

EXAMPLE OPERATING ENVIRONMENTS

Figure 8:
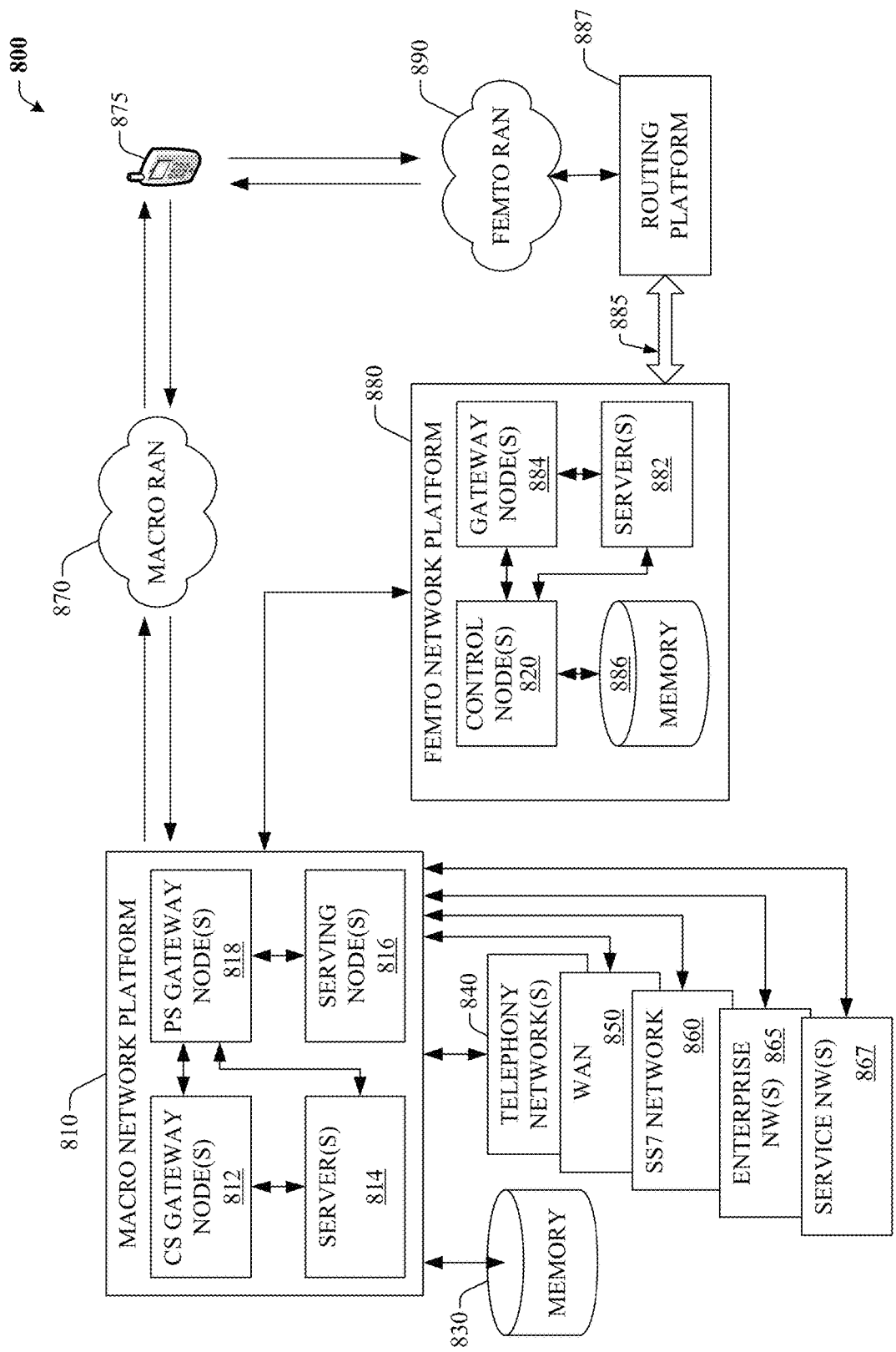
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication) with user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 870 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
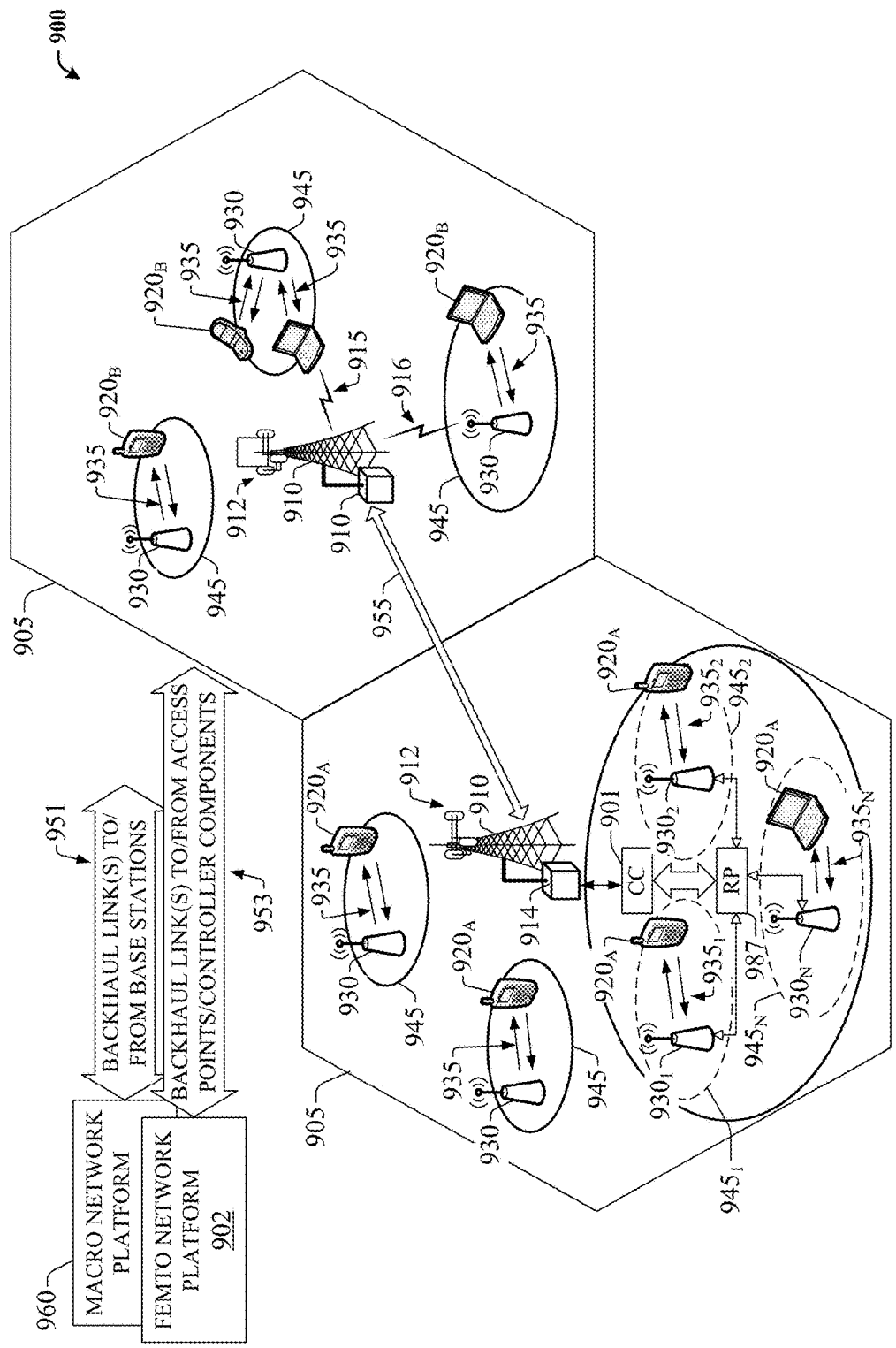
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE 920$_A$, 920$_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE 920A, 920B can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs 920$_A$ can be routed by the RP 987, for example, internally, to another UE 920$_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points 930$_1$-930$_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE 920$_A$ connected to femto APs 930$_1$-930$_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas 912$_1$-912$_N$. It should be appreciated that while antennas 912$_1$-912$_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
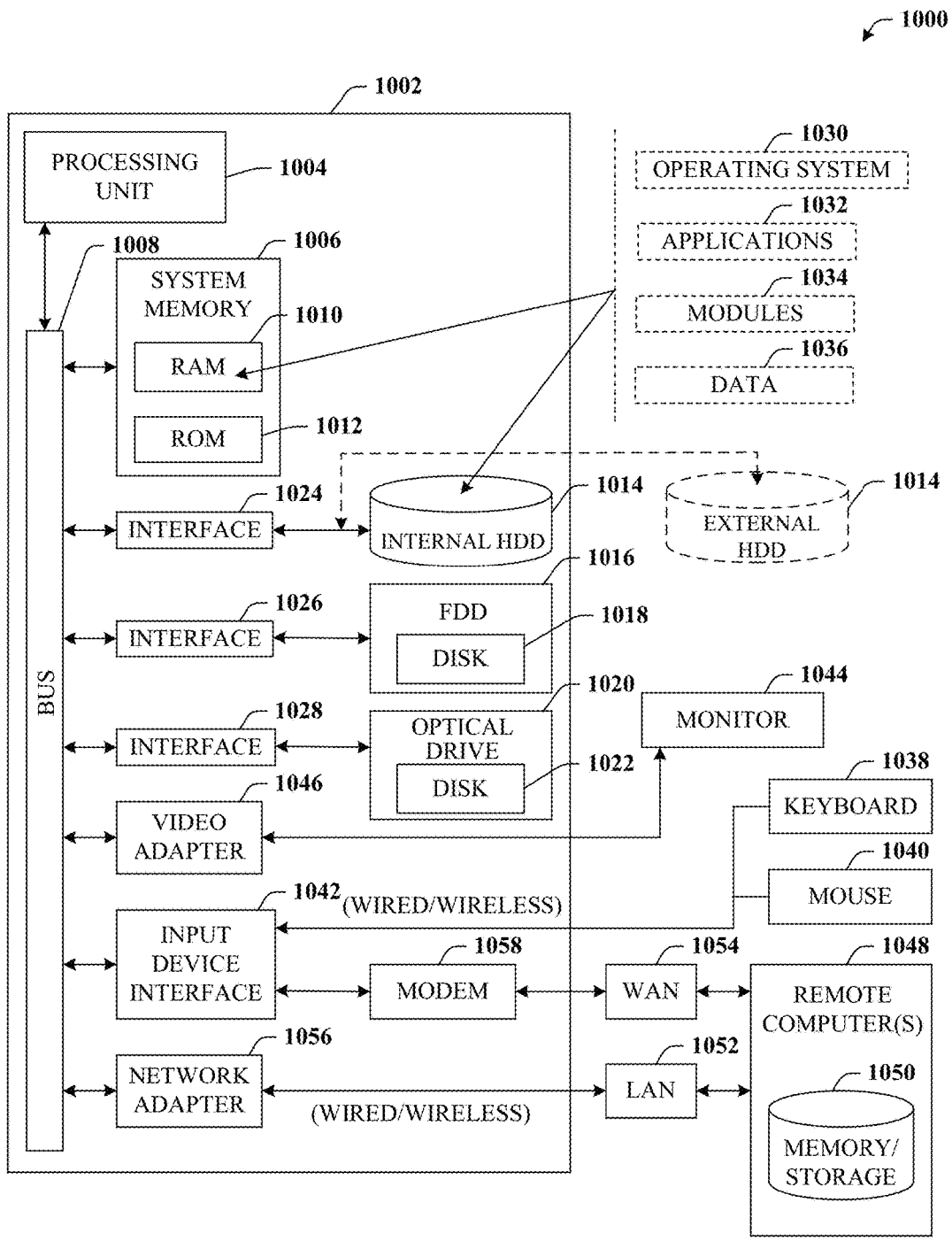
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various aspects of the disclosed subject matter, FIG. 10 and the following discussion are intended to provide a brief, general description of a suitable computing environment 1000 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 10, the exemplary environment 1000 for implementing various aspects of the disclosed subject matter comprises a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also comprise a high-speed RAM such as static RAM for caching data.

The computer 1002 further comprises an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the disclosed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may comprise a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically comprises other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also comprise a wireless access point disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
a processor; and
a memory that stores executable instructions that, when executed by the processor, facilitate performance of operations, comprising:
determining that an event storm has occurred in response to a volume of raw event records generated by a group of network devices being determined to have exceeded a defined threshold at a defined time;
instructing a network device of the group of network devices to generate aggregated event records representative of an aggregation of the raw event records generated after the defined time;
instructing the network device to transmit the aggregated event records according to a mixed ordering protocol comprising:
transmitting a first portion of the aggregated event records according to a first-in-first-out protocol that populates the first portion with first members of the aggregated event records that were generated nearest to the defined time; and
transmitting a second portion of the aggregated event records according to a last-in-first-out protocol that populates the second portion with second members of the aggregated event records that were generated nearest to a current time.

2. The device of claim 1, wherein the mixed ordering protocol comprises a configurable ratio representative of a first number of records of the first portion to a second number of records of the second portion.

3. The device of claim 2, wherein the operations further comprise updating the configurable ratio to apply more weight to the first portion in response to a determination that information about a cause of the event storm is to be prioritized.

4. The device of claim 2, wherein the operations further comprise updating the configurable ratio to apply more weight to the second portion in response to a determination that information about a current state of the event storm is to be prioritized.

5. The device of claim 1, wherein the defined threshold is a rate of change threshold that is exceeded in response to a determination that a plot, of a number of the raw event records generated by the group of network devices over time, has an increasing slope for n consecutive time intervals, and wherein n is a positive integer.

6. The device of claim 5, wherein n is greater than two.

7. The device of claim 1, wherein the defined threshold is a volumetric threshold that is exceeded in response to a volumetric maximum determined as a first derivative function of a number of the raw event records generated over time by the group of network devices.

8. The device of claim 1, wherein the operations further comprise determining a level of aggregation based on the volume of the raw event records and instructing the network device to aggregate the raw event records generated after the defined time by the level of aggregation.

9. The device of claim 8, wherein the volume is a first volume, the level of aggregation is a first level of aggregation, the defined time is a first defined time, and the operations further comprise:
determining that a second volume of the aggregated event records exceeds the defined threshold at a second defined time; and
instructing the network device to perform a second level of aggregation on the raw event records generated after the second defined time.

10. The device of claim 8, wherein the level of aggregation is applied over a defined time window as a function of network throughput between the network device and the device.

11. The device of claim 8, wherein the operations further comprise, in response to a determination that available throughput exists between the network device and the device, instructing the network device to reduce the level of aggregation.

12. A machine-readable storage medium, comprising executable instructions that, when executed by a processor, facilitate performance of operations, comprising:
determining that a volume of raw event records generated by a group of network devices exceeds a defined threshold at a defined time;
instructing a network device of the group of network devices to generate aggregated event records representative of an aggregation of the raw event records generated after the defined time; and
instructing the network device to transmit the aggregated event records according to a mixed ordering approach comprising transmitting a first portion of the aggregated event records according to a first-in-first-out approach and transmitting a second portion of the aggregated event records according to a last-in-first-out approach.

13. The machine-readable storage medium of claim 12, wherein the mixed ordering approach comprises a configurable ratio representative of a first number of records of the first portion to a second number of records of the second portion.

14. The machine-readable storage medium of claim 13, wherein the operations further comprise configuring the configurable ratio to be approximately a half for the transmitting of the first portion of the aggregated event records according to the first-in-first-out approach and another half for the transmitting of the second portion of the aggregated event records according to the last-in-first-out approach.

15. The machine-readable storage medium of claim 13, wherein the operations further comprise configuring the configurable ratio to more heavily weight the first portion in response to a determination that information about a cause of the volume exceeding the defined threshold is to be prioritized.

16. The machine-readable storage medium of claim 13, wherein the operations further comprise configuring the configurable ratio to more heavily weight the second portion in response to a determination that information about a current state of a network comprising the group of network device is to be prioritized.

17. A method, comprising:
    determining, by a device comprising a processor, that a volume of raw event records generated by a group of network devices exceeds a defined threshold at a defined time;
    instructing, by the device, a network device of the group of network devices of a network to generate aggregated event records representative of an aggregation of the raw event records generated after the defined time; and
    instructing, by the device, the network device to transmit the aggregated event records according to a mixed ordering protocol comprising transmitting a first portion of the aggregated event records according to a first-in-first-out protocol and transmitting a second portion of the aggregated event records according to a last-in-first-out protocol.

18. The method of claim 17, further comprising configuring, by the device, a ratio of the mixed ordering protocol, wherein the ratio represents a quantity of records of the first portion to the second portion.

19. The method of claim 18, further comprising configuring, by the device, the ratio to more heavily weight the first portion in response to a determination that information about a cause of the volume exceeding the defined threshold is to be prioritized.

20. The method of claim 18, further comprising configuring, by the device, the ratio to more heavily weight the second portion in response to a determination that information about a current state of the network comprising the group of network device is to be prioritized.

\* \* \* \* \*